United States Patent Office 3,480,440
Patented Nov. 25, 1969

3,480,440
HARDENING OF PHOTOGRAPHIC GELATIN-
CONTAINING LAYERS
Wolfgang Himmelmann, Cologne-Stammheim, Alexander Riebel, Leverkusen, and Karl-Friedrich Zenner and Heinz Meckl, Cologne-Flittard, Germany, assignors to Agfa-Gevaert Aktiengesellschaft, Leverkusen, Germany, a corporation of Germany
No Drawing. Filed June 1, 1966, Ser. No. 554,365
Claims priority, application Germany, June 11, 1965,
A 49,449; Sept. 27, 1965, A 50,354
Int. Cl. G03c 1/30
U.S. Cl. 96—111          7 Claims

ABSTRACT OF THE DISCLOSURE

This invention relates to the hardening of gelatin-containing layers to enhance resistance to water, by incorporating therein compounds containing alkoxymethylurea-groups.

Several different agents for crosslinking or hardening gelatines are already known. Included among them are, for example, metal salts such as chromium, aluminum or zirconium salts, aldehydes or their derivatives, particularly formaldehyde, dialdehydes, mucochloric acid, diketones, quinones and chlorides or dibasic organic acids, dianhydrides and compounds with a number of reactive vinyl groups such as vinyl sulfones and acrylamides. Compounds containing at least two readily-opened three-member heterocyclic rings, such as ethylene oxide and ethylene imine, may also be used as hardening agents for gelatines. Polysulfonic acid methyl esters and bis-α-chloroacylamido compounds, as well as derivatives of cyanuric chloride and dichloroquinoxaline derivatives, have also been used for this purpose.

More recently, high molecular weight hardening agents have been developed, for example, polyacrolein and its derivatives or copolymers and alginic acid derivatives, which are specially used as "layer-restricted" hardening agents.

Unfortunately, many of the aforementioned compounds have in many instances exhibited unwanted photographic effects of one kind or another. Some are themselves photographically active while others detrimentally affect the physical properties, for example the brittleness, of gelatin layers to such an extent that they cannot be used. In addition, others show a tendency towards discoloration or are inclined to undergo a change in pH during the hardening reaction. Finally, one particularly important condition governing the use of photographic layers is that hardening should reach its maximum in the shortest possible time after drying in order to avoid constant changes in the penetrability of the layer by the developer solution, as is the case with, for example, mucochloric acid or formaldehyde.

In some instances, crosslinking agents for gelatines, for example, ethylene imine compounds or cyanuric chloride derivatives, have a damaging effect on the skin so that physiological reasons prevent their use.

Finally, another important factor affecting hardening agents for photographic gelatin-containing layers, for reasons both of production and of processing, is that the beginning of the crosslinking reaction be controlled, for example, by suitable choice of the drying temperature or of the pH-value.

One object of the present invention is to provide hardening agents for gelatin layers which exhibit no known detrimental photographic effects. Another object is to provide hardening agents for photographic gelatin layers, which yield adequate hardening in short periods and which actually cause the photographic layers to harden before processing.

It has now been found that reaction products of alkoxymethyl isocyanates with compounds carrying at least two primary or secondary amino groups, are suitable for use as hardening agents for gelatin layers. The substances to be used in accordance with the present invention are characterized by at least two alkoxymethyl urea groupings. These substances are soluble in water or in mixtures of water and water-miscible organic solvents, for example, acetone or acetonitrile. They are outstanding hardening agents for gelatin-containing layers in the weakly acid, neutral and weakly alkaline pH-range, i.e., between pH 3 and 10.

Suitable compounds include those of the following formula

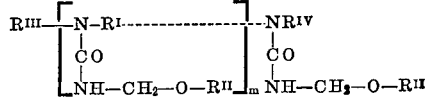

wherein
$R^I$=a bivalent organic grouping, such as (I) alkylene having preferably up to 18 carbon atoms, (II) cycloalkylene such as cyclohexylene or cyclopentylene, (III) aralkylene, preferably benzylene or xylylene or (IV) phenylene or mixtures thereof; the said organic grouping may be substituted, for example, by hydroxy, alkoxy with up to 5 carbon atoms, quaternary ammonium groups, sulfo or carboxy groups or salts thereof, particularly with alkali metals, or esters thereof, particularly with short chain alcohols with up to 5 carbon atoms, carbamyl, alkyl or hydroxyalkyl, or halogen such as chlorine or bromine; the organic groupings, in particular the alkylene chain may be interrupted by heteroatoms or groups such as —O—,

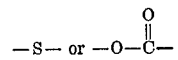

or may even contain acylamino groups such as

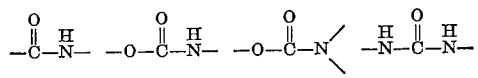

or substituted, particularly alkyl-substituted, urea groups, the alkyl groups of which preferably contain up to 5 carbon atoms; in addition, the substituent $R^I$ may contain further crosslinkable alkoxymethyl urea groupings; $R^I$ further represents the methylene groups necessary to complete a 5- or 6-member heterocyclic ring, whereby both N-atoms to which $R^I$ is attached are memebrs of the heterocyclic rings, for example, piperazine or imidazolidine rings;
$R^{II}$=(I) saturated or olefinically unsaturated aliphatic radicals with preferably up to 12 carbon atoms, which may be substituted, for example, by halogen such as chlorine, alkoxy with preferably up to 5 carbon atoms or phenyl, benzyl or phenylethyl, or (II) cycloalkyl radicals, the grouping advantageously also containing up to 12 carbon atoms, in particular up to 10 carbon atoms;

$R^{III}$=hydrogen or alkyl with preferably up to 5 carbon atoms, the alkyl radical may be substituted with hydroxyl, sulfo or carboxyl groups, or salts thereof, particularly alkalimetal salts, or esters thereof particularly with short-chain aliphatic alcohols with up to 5 carbon atoms, or the like;

$R^{IV}$=has the same meaning as $R^{III}$, and $m$=1–1000, particularly 2 to 20, preferably 2 to 4.

Compounds corresponding to the above general formula which contain at least two alkoxymethyl urea groups for a molecular weight of 500–1500, in particular of about 1000, are preferred. Particular utility is exhibited by reaction products of gelatin with alkoxymethylisocyanates.

The following reaction products are, for example, effective:

*Compound 1.*—The reaction product of 1 mol of ethylene diamine with 2 mols of ethoxymethyl isocyanate.

*Compound 2.*—The reaction product of 1 mol of ethylene diamine with 2 mols of n-propoxymethyl isocyanate.

*Compound 3.*—The reaction product of 1 mol of ethylene diamine with 2 mols of isopropoxymethyl isocyanate.

*Compound 4.*—The reaction product of 1 mol of ethylene diamine with 2 mols of isobutoxymethyl isocyanate.

*Compound 5.*—The reaction product of 1 mol of tetramethylene diamine with 2 mols of methoxymethyl isocyanate.

*Compound 6.*—The reaction product of 1 mol of hexamethylene diamine with 2 mols of methoxymethyl isocyanate.

*Compound 7.*—The reaction product of 1 mol of tetraethylene pentamine with 5 mols of methoxymethyl isocyanate.

*Compound 8.*—The reaction product of 1 mol of dipropylene triamine with 3 mols of methoxymethyl isocyanate.

*Compound 9.*—The reaction product of 1 mol of diethylene triamine with 3 mols of methoxymethyl isocyanate.

*Compound 10.*—The reaction product of 1 mol of N-β-hydroxyethyl-ethylene diamine with 2 mols of methoxymethyl isocyanate.

*Compound 11.*—The reaction product of 5 mols of N, N-(di-2-hydroxypropyl)-N'-methoxymethyl urea with 4 mols of 1,6-hexamethylene diisocyanate.

*Compound 12.*—The reaction product of 1 mol of N, N'-dimethylethylene diamine with 2 mols of methoxymethyl isocyanate.

*Compound 13.*—The reaction product of 1 mol of piperazine with 2 mols of methoxymethyl isocyanate.

*Compound 14.*—The reaction product of $$C_2H_5—C\equiv[—CH_2—O(CH_2)_3—NH_2]_3$$

with 3 mols of methoxymethyl isocyanate.

*Compound 15.*—The reaction product of 1 mol of bis-(amino-propyl)-ether with 2 mols of methoxymethyl isocyanate.

*Compound 16.*—The reaction product of 1 mol of $C_4H_8=[O(CH_2)_3—NH_2]_2$ with 2 mols of methoxymethyl isocyanate.

*Compound 17.*—The reaction product of 1 mol of di-amino-diphenylmethane with 2 mols of methoxymethyl isocyanate.

*Compound 18.*—The reaction product of 1 mol of di-aminocyclohexane with 2 mols of methoxymethyl isocyanate.

*Compound 19.*—The reaction product of 1 mol of

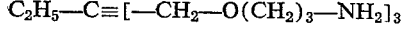

$NH_2—CH_2—CH_2—NH—CH_2—CH_2—CH_2—SO_3^{\ominus}K^{\oplus}$ with 2 mols of methoxymethyl isocyanate.

*Compound 20.*—The reaction product of 1 mol of sodium 3,4-diaminobenzoate with 2 mols of methoxymethyl isocyanate.

*Compound 21.*—The reaction product of 1 mol of 3,4-diamino benzene sulfonate with 2 mols of methoxymethyl isocyanate.

*Compound 22.*—The reaction product of 1 mol of $[NH_2—(CH_2)_3—O—(CH_2)_2—]_2=O$ with 2 mols of methoxymethyl isocyanate.

The reaction products of alkoxymethyl isocyanates with, for example, the following polyamines, are also suitable:

N,N'-dimethylethylene diamine,
3,3'-diamino-propyl methylamine,
3,3'-diaminodipropyl ether,
dodecamethylene-1,12-diamine 3-methoxyhexylene-1,6-diamine,
ω,ω'-diamino-1,4-butylene glycol dipropyl ether,
hexahydrophenylene-1,3-diamine,
3,3'-diaminopropyldimethyl ammonium chloride,
ethyl N-2-aminopropyl-aminoacetate,
sodium N-2-aminopropylaminoacetate,
potassium N-2-aminoethyl-3-aminopropane sulfonate,
ω,ω'-octaethylene glycol di-3-aminopropylether,
4,6-diaminomethyl-1,3-dimethyl benzene,
1,3-diaminomethylcyclohexane,
4,4'-diaminomethyldicyclohexyl methane,
4-aminobenzylamine,
4,4'-diaminohexahydrobenzidine,
4,4'-diaminohexahydrodiphenyl methane,
4,4',4''-triaminotricyclohexyl methane,
aminoacetic acid-2-aminoethyl amide,
N,N'-dimethyl N,N'-bis-(3-aminopropylurea),
tetra-3-aminopropyl urea,
resorcindi-3-aminopropylether,
1,3-phenylene diamine,
2,4-diamino-4,6-disulfonic acid, and
4,4',4''-triaminotriphenyl methane.

*Compound 23.*—1.3 g. of methoxymethyl isocyanate are dissolved in 7 ml. of acetone and 2.3 ml. of this solution are incorporated by stirring into 200 ml. of 10% gelation solution at 35° C. The solution can be solidified and be melted again before use.

*Compound 24.*—1.5 g. of ethoxymethyl isocyanate are dissolved in 15 ml. of acetone and incorporated by stirring into 630 ml. of 8% gelatin solution at 35° C. The prepared solution is solidified at 0° C.

*Compound 25.*—As with Compound 24, but with 1.7 g. of n-propoxymethyl isocyanate, dissolved in 15 ml. of acetone.

*Compound 26.*—As with Compound 24, but with 1.7 g. of iso-propoxymethyl isocyanate, dissolved in 15 ml. of acetone.

*Compound 27.*—As with Compound 24, but with 1.98 g. of isobutoxymethyl isocyanate, dissolved in 15 ml. of acetone.

*Compound 28.*—As with Compound 24, but with 2.93 g. hydrocinnamoxy-methyl isocyanate, dissolved in 15 ml. of acetone.

The preparation of the alkoxymethyl isocyanates is described in German Patent No. 1,205,087. The isocyanates are reacted with the corresponding amines in known manner. For example, the individual amines and alkoxymethyl isocyanates may be reacted at room temperature in suitable molar ratios in the presence of a relatively inert solvent, for example, acetone, water or alcohols, and the reaction products may be isolated either by crystallization or by evaporating off the solvent. It is of course possible for the resulting solutions, for example, in water, to be directly used.

Alkoxymethyl isocyanates which are suitable are characterized by the following formula:

$R^{II}—O—CH_2—N=C=O$

The following specific alkoxymethyl isocyanates may be mentioned:

Methoxymetyhl isocyanate, ethoxymethyl isocyanate, n-propoxymethyl isocyanate, iso-propoxymethyl isocyanate, isobutyloxymethyl isocyanate, n-hexyloxymethyl isocyanate, β-chloroethoxymethyl isocyanate, cyclohexyloxymethyl isocyanate and hydrocinnamoxymethyl isocyanate.

The above compounds are characterized by two substituents which are reactive with the amino groups of the reaction component, for example, the gelatin. These reactive substituents are the isocyanate grouping and the methylol ether grouping, the former initially reacting substantially more quickly with the amino groups. If the above compounds are introduced into a solution of the amino compounds, the isocyanate groups immediately react with the amino groups to form, for example, the corresponding urea derivatives of water-soluble gelatin. The alkoxymethyl isocyanates are added to the solution of the amino compound advantageously as a solution in an inert solvent. All solvents which do not react with isocyanate groups can be used, such as acetone, methyl ethyl ketone, acetonitrile, tetrahydrofuran, dioxane, ethylene glycol, dimethyl formamide or tetramethylene sulfone.

The preparation of a few compounds is described in detail below:

Compound 1

40.5 g. of ethoxymethyl isocyanate are added dropwise while cooling to a solution of 12 g. of ethylene diamine in 200 cc. of methylene chloride. The resulting bis-ethoxymethyl urea of the ethylene diamine precipitates, is suction-filtered and dried.

Compounds 2 to 10 are similarly prepared. The following solvents, for example, are suitable for use as the reaction media: acetone, acetonitrile, tetrahydrofuran, ethanol or water.

Compound 12

A solution of 29.4 g. of 1,6-hexamethylene diisocyanate in 100 ml. of acetone is slowly added dropwise while stirring at up to 50° C. to a solution of 48.1 g. of the reaction product of di-2-hydroxypropyl-1-amine and methoxymethyl isocyanate (molar ratio 1:1) in 400 ml. of acetone. The mixture is stirred until no more free isocyanate can be detected. A 12.7% by weight solution of the following compound is formed perature and at pH values which are below 7, advantageously about 3.5 to 6.5. If diffusion-resistant high-molecular hardeners are used, such as reaction products of alkoxymethylisocyanate with gelatine, it is possible, in this way, to carry out layer-limited hardening at pH values which are below 7.

The photographic layers treated according to the present invention are quite generally layers which are used in connection with photographic materials, for example, light-sensitive silver halide emulsion layers or non-light-sensitive layers such as protective layers, filter layers, anti-halation layers, backing layers, nucleated layers or quite generally auxiliary photographic layers. The effectiveness of the compounds used in accordance with the invention is not affected by the conventional photographic additives. Similarly, the hardening agents according to the invention are not affected by photographically-active substances such as color couplers, stabilizers and sensitizers. In addition, they do not have any effect on the light-sensitive silver halide emulsions.

The concentration in which the hardening agents according to the invention are used may be varied within wide limits. It is largely dependent upon the type of hardening agent, i.e., upon the percentage component of the hardening alkoxymethyl urea groupings. The quantity added is also governed by the required degree of hardening. In general, they may be added in quantities from 0.25 to 95% by weight, based on gelatin. In the case of low molecular weight hardening agents containing at least two alkoxymethyl urea groupings for a molecular weight of approximately 1000, quantities as small as 0.25 to 5% by weight are sufficient to produce adequate hardening. In the case of hardening agents of high molecular weight, for example, the reaction products of alkoxymethyl isocyanates with polyamines, gelatin, casein or other proteins, higher concentrations within the aforementioned limits are generally desirable. In this case, these compounds simultaneously act as layer vehicles. This is in particular true for reaction products of gelatin with alkoxymethylisocyanates, since in this case the reaction product itself can be used as binding agent for the photographic layer. Such reaction product is for example used in a concentration of at least 25% by weight based on the total binding agent of the layer.

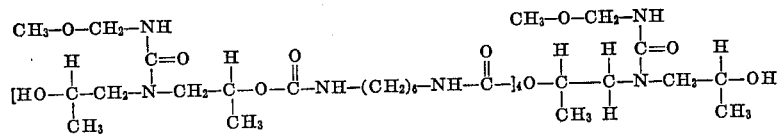

The reaction with gelatin can be carried out by the method of reaction known per se of isocyanates with gelatin, in that a solution of the alkoxymethyl isocyanate in an inert solvent, such as acetone, is incorporated by stirring into an aqueous gelatin solution at 35 to 40° C. Generally speaking, 30 to 100% of the primary amino groups of the gelatin which are theoretically to be expected can be reacted with alkoxymethyl isocyanates, but it has nevertheless proved most advantageous if about 66% of the amino groups of the gelatin are reacted with alkoxythiocyanate. These solutions can also, if desired, be blended with pure gelatin or photographic-gelatin-containing emulsions up to the ratio 1:2, based on gelatin reaction product, without the hardening effect being impaired.

The compounds to be used in accordance with the invention are generally soluble in water and are preferably added to the gelatin layers to be hardened before casting. If desired, it is possible to use solutions in water miscible solvents, for example, acetone.

The cross-linking of this gelatin derivative does not take place immediately, but only with the drying of the solution, preferably with the use of relatively high tem- The hardening reaction with the gelatin does not take place immediately but only after the layer has been dried, simply by leaving the reactants to stand or preferably by exposing them to relatively high temperatures in the range from 40 to 120° C. Crosslinking is further accelerated by adjustment to pH-values of below 7, preferably in the range from 3.5 to 6.5.

The hardening agents according to the invention may also be used in combination with known hardeners such as formaldehyde, triacryl formal, divinyl sulfone, muco-chloric acid or mucobromic acid. The melting point of the layers is determined as follows:

The layer strips on a support are immersed until half-covered in water whose temperature is raised at intervals by 10° C. The melting point is defined as the temperature at which the layer separates from the support (striation).

EXAMPLE 1

200 ml. of a gelatin solution (10% by weight) are adjusted to pH 6.2 and then mixed with each of the solution of the hardening agents according to the invention mentioned below. The resulting mixture is then cast onto a tri-acetyl cellulose support provided with a subbing layer.

A clear gelatin layer of the kind used as a backing layer or protective layer for photographic materials is obtained. The melting points are in each case measured after 36 hours' storage at 56° C. and 40% relative humidity and after 12 hours' storage at room temperature.

The additions to 200 ml. of the above gelatin solution are as follows:

(1a) 20 ml. of a 1% by weight aqueous solution of compound 1 (=1% addition)
(b) 40 ml. of a 1% by weight aqueous solution of compound 1 (=2% addition)
(2a) 20 ml. of a 1% by weight solution of compound 2 in acetone/water (1:1) (=1% addition)
(b) 40 ml. of a 1% by weight solution of compound 2 in acetone/water (1:1) (=2% addition)
(3a) 20 ml. of a 1% by weight hot aqueous solution of compound 5
(b) 40 ml. of a 2% by weight hot aqueous solution of compound 5. These correspond to 1 and 2% additions, respectively, based on gelatin
(4a) 20 ml. of a 1% by weight aqueous solution of compound 6
(b) 40 ml. of a 1% by weight aqueous solution of compound 6
(5a) 20 ml. of a 1% by weight aqueous solution of compound 7
(b) 40 ml. of a 1% by weight aqueous solution of compound 7
(6a) 20 ml. of a 1% by weight aqueous solution of compound 8
(b) 40 ml. of a 1% by weight aqueous solution of compound 8
(7a) 20 ml. of a 1% by weight aqueous solution of compound 9
(b) 40 ml. of a 1% by weight aqueous solution of compound 9
(8a) 20 ml. of a 1% by weight aqueous solution of compound 10
(b) 40 ml. of a 1% by weight aqueous solution of compound 10
(9) 40 ml. of a 1% by weight aqueous solution of compound 11
(10a) 1% by weight addition, based on gelatin as binder, of compound 12
(b) 2% by weight addition, based on gelatin as binder, of compound 12
(11) 1% by weight addition, based on gelatin as binder, of compound 13
(12a) 1% by weight addition, based on gelatin as binder, of compound 14
(b) 2% by weight addition, based on gelatin as binder, of compound 14
(13) 1% by weight addition, based on gelatin as binder, of compound 15
(14a) 1% by weight addition, based on gelatin as binder, of compound 16
(b) 2% by weight addition, based on gelatin as binder, of compound 16
(15a) 1% by weight addition, based on gelatin as binder, of compound 17
(b) 2% by weight addition, based on gelatin as binder, of compound 17
(16a) 1% by weight addition, based on gelatin as binder, of compound 18
(b) 2% by weight addition, based on gelatin as binder, of compound 18
(17a) 1% by weight addition, based on gelatin as binder, of compound 19
(b) 2% by weight addition, based on gelatin as binder, of compound 19
(18a) 1% by weight addition, based on gelatin as binder, of compound 20
(b) 2% by weight addition, based on gelatin as binder, of compound 20
(19) 5% by weight addition, based on gelatin as binder, of compound 21
(20) 5% by weight addition, based on gelatin as binder, of compound 22.

LAYER MELTING POINT

| Test: | After 12 hours' storage at room temperature (° C.) | After 36 hours' storage at 56° C. and 40% relative humidity (° C.) |
|---|---|---|
| Without additive | 30 | 35 |
| 1a | 30 | 100 |
| 1b | 40 | 100 |
| 2a | 30 | 100 |
| 2b | 40 | 100 |
| 3a | 30 | 100 |
| 3b | 40 | 100 |
| 4a | 60 | 100 |
| 4b | 80 | 100 |
| 5a | 40 | 100 |
| 5b | 40 | 100 |
| 6a | 70 | 100 |
| 6b | 70 | 100 |
| 7a | 50 | 100 |
| 7b | 70 | 100 |
| 8a | 40 | 100 |
| 8b | 40 | 100 |
| 9 | 30 | 100 |
| 10a | 30 | 100 |
| 10b | 40 | 100 |
| 11 | 30 | 100 |
| 12a | 40 | 100 |
| 12b | 40 | 100 |
| 13 | 40 | 100 |
| 14a | 30 | 100 |
| 14b | 30 | 100 |
| 15a | 30 | 45 |
| 15b | 30 | 100 |
| 16a | 30 | 60 |
| 16b | 30 | 100 |
| 17a | 30 | 70 |
| 17b | 40 | 100 |
| 18a | 30 | 40 |
| 18b | 30 | 100 |
| 19 | 40 | 100 |
| 20 | 30 | 100 |

In other tests, the melting points of layers hardened in accordance with the invention were measured after 5 minutes treatment with a 5% by weight aqueous soda solution immediately after drying, and after storage under the aforementioned conditions. In all these tests, it was found that the effectiveness of the hardening agents according to the invention is not detrimentally affected.

On no occasion did pure gelatin layers undergo an increase in melting point under the conditions of measurement.

EXAMPLE 2

120 ml. of a 1% by weight aqueous solution of compound 7 (1.5% by weight addition, based on gelatin dry weight) are added to 1 liter of a silver chlorobromide emulsion containing 80 g. of gelatin, and the pH-value was adjusted to 6.2. In addition, the conventional casting additives are added to the solution which is then poured onto a support of polyethylene terephthalate provided with a subbing layer and dried at room temperature.

The melting points of the layer were as follows:

(1) 40° C. after 12 hours storage at room temperature,
(2) 100° C. after 36 hours storage at 56° C. and 40% relative humidity, and
(3) 100° C. after processing following storage as in (2), i.e., after treatment in a developer bath and rinsing with water.

The photographic properties of the layer remained unaffected, neither was there any fogging.

EXAMPLE 3

120 ml. of an 8% by weight aqueous solution of the alkali metal salt of a coupler suitable for chromogenic color development, corresponding to the following formula

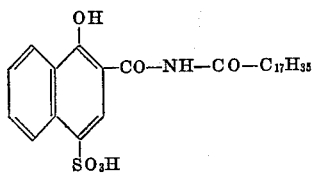

are added to 400 ml. of a silver chlorobromide emulsion containing 32 g. of gelatin. Following the addition of the conventional casting additives, 250 ml. of water are added, the pH value is adjusted to 6.2 and the resulting solution is mixed with 32 ml. of a 1% by weight aqueous solution of compound 1. The solution which is now ready for casting is poured onto an acetyl cellulose support provided with a subbing layer. The layers were dried at room temperature. The melting points of the layer thus obtained were as follows:

(1) 55° C. after 36 hours storage at room temperature,
(2) 100° C. after 36 hours storage at 56° C. and 40% relative humidity, and
(3) 100° C. after processing following storage as in (2), i.e., after treatment in a color-forming bath, fixing bath, bleaching bath and rinsing with water.

The photographic properties of the layer remained unaffected. A cyan image is obtained after color-forming processing.

EXAMPLE 4

200 ml. of a 10% solution of the Compound 24 are melted, the pH value is adjusted to 6.2 and applied onto a support of acetyl cellulose and provided with a subbing layer. 100 ml. of the 10% solution of Compound 23 are mixed in a second bath with 100 ml. of 10% gelatin solution and cast in the same way.

The melting points of the layers are determined as described hereinbefore.

The following table sets out the data obtained with the layers after being kept for 12 hours at room temperature (Specimen A) and after being kept for 36 hours at 56° C. and 40% relative air humidity (Specimen B):

|  | Melting point, ° C. | |
|---|---|---|
|  | Specimen A | Specimen B |
| Layer: | | |
| Undiluted | 55 | >100 |
| Diluted 1:1 with gelatin | 35 | >100 |

The viscosity of the casting solutions has remained practically unchanged over a period of 5 hours at 40° C., so that the crosslinking has only taken place on drying.

EXAMPLE 5

The procedure of Example 4 is followed, but using the corresponding quantities of Compound 24 and drying of the layers with warm air.

|  | Melting point, ° C. | |
|---|---|---|
|  | Specimen A | Specimen B |
| Layer: | | |
| Undiluted | 100 | >100 |
| Diluted 1:1 with gelatin | 80 | >100 |

Whereas the viscosity of the undiluted solution rose slightly in a period of 5 hours at 40° C., the viscosity of the diluted solution remained constant over the same period.

EXAMPLE 6

Procedure as indicated in Example 5, but with the corresponding quantities of Compound 25.

|  | Melting point, ° C. | |
|---|---|---|
|  | Specimen A | Specimen B |
| Layer: | | |
| Undiluted | >100 | >100 |
| Diluted 1:1 with gelatin | 68 | >100 |

With this substance, the viscosity of the undiluted solution also rose slightly on standing at 40° C., whereas the viscosity of the dilute solution remained constant.

EXAMPLE 7

Procedure as in Example 5, but with the corresponding quantities of Compound 26.

|  | Melting point, ° C. | |
|---|---|---|
|  | Specimen A | Specimen B |
| Layer: | | |
| Undiluted | 100 | 100 |
| Diluted 1:1 with gelatin | 68 | 100 |

The viscosity of the undiluted solution rose slightly on standing for more than 5 hours at 40° C., but the viscosity of the diluted solution remained constant.

EXAMPLE 8

Procedure as in Example 5, but with the corresponding quantities of the Compound 27.

|  | Melting point, ° C. | |
|---|---|---|
|  | Specimen A | Specimen B |
| Layer: | | |
| Undiluted | 100 | 100 |
| Diluted 1:1 with gelatin | 60 | 100 |

Slight increase in viscosity of the solution as regards the undiluted specimen.

EXAMPLE 9

Procedure as in Example 5, but with the corresponding quantities of Compound 28.

|  | Melting point, ° C. | |
|---|---|---|
|  | Specimen A | Specimen B |
| Layer: | | |
| Undiluted | 80 | 100 |
| Diluted with 1:1 with gelatin | 80 | 100 |

Slight increase in viscosity of the undiluted solution over 5 hours at 40° C.

EXAMPLE 10

A silver chlorobromide emulsion, containing 80 g. of gelatin per liter, is blended with one of the Compounds 24 to 29 in such a way that the ratio between gelatin and hardener is 1:1. The solution obtained is brought to pH 6.2, cast onto an acetyl cellulose layer support and dried with an air temperature of about 50° C. The melting points of the layer were determined.

(A) after being kept for 36 hours at room temperature,
(B) after being kept for 36 hours at 56° C. and 40% relative air humidity,
(C) after being processed, subsequent to (B), i.e., after development, fixing and rinsing.

| | Melting point ° C. |
|---|---|
| A | 80 |
| B | 100 |
| C | 100 |

The photographic properties remained unchanged after having been kept in a heated cupboard. No fogging occured.

A pure gelatin layer is practically unchanged under the measuring conditions used in the above examples. The melting point is in the range of 30 to 35° C.

We claim:
1. In a process for the production of photographic gela- tin layers by applying the casting solution onto the support and drying the resulting layer, the improvement consisting of drying the layer in effective contact with a hardening amount of a compound containing at least 2 alkoxymethylurea groupings.

2. A process as defined in claim 1, wherein the compound containing the alkoxymethylurea groups has at least two such groups per molecular weight unit of 500 to 1500.

3. A process as defined in claim 1, wherein the compound containing the alkoxymethylurea groupings is a modified gelatin 30–100% of the primary amino groups of which are reacted with alkoxymethylisocyanates.

4. A process as defined in claim 1, wherein the casting solution has a pH between 3.6 and 6.5, and wherein the drying is performed at a temperature between 40 and 120° C.

5. A process as defined in claim 3, wherein the modified gelatin is contained in the undried gelatin layer in an amount of at least 25% by weight, based on the total binding agent of the layer.

6. In a photographic material having a support carrying a gelatin layer, the improvement according to which the gelatin is a hardened gelatin resulting from reacting gelatin with a compound having at least two alkoxymethylurea groups.

7. In a photographic material having a support carrying a gelatin layer, the improvement according to which the gelatin is a hardened gelatin resulting from reacting gelatin with alkoxymethylisocyanates.

References Cited

UNITED STATES PATENTS

| | | | |
|---|---|---|---|
| 2,354,662 | 8/1944 | Bryce | 96—111 X |
| 2,614,928 | 10/1952 | Yutzy et al. | 96—94 |
| 3,103,437 | 9/1963 | Henn et al. | 117—164 X |
| 3,124,605 | 3/1964 | Wagner | 260—453 |
| 3,291,624 | 12/1966 | Jeffreys et al. | 260—117 X |
| 3,374,095 | 3/1968 | Dieterich et al. | 96—111 |
| 3,383,400 | 5/1968 | Meisert et al. | 260—453 |

WILLIAM D. MARTIN, Primary Examiner

M. R. LUSIGNAN, Assistant Examiner

U.S. Cl. X.R.

106—125; 117—34, 164; 260—117